Inventors
John F. Lovely
Ralph M. Gamble
by Wright, Brown, Quinby & May
Attys.

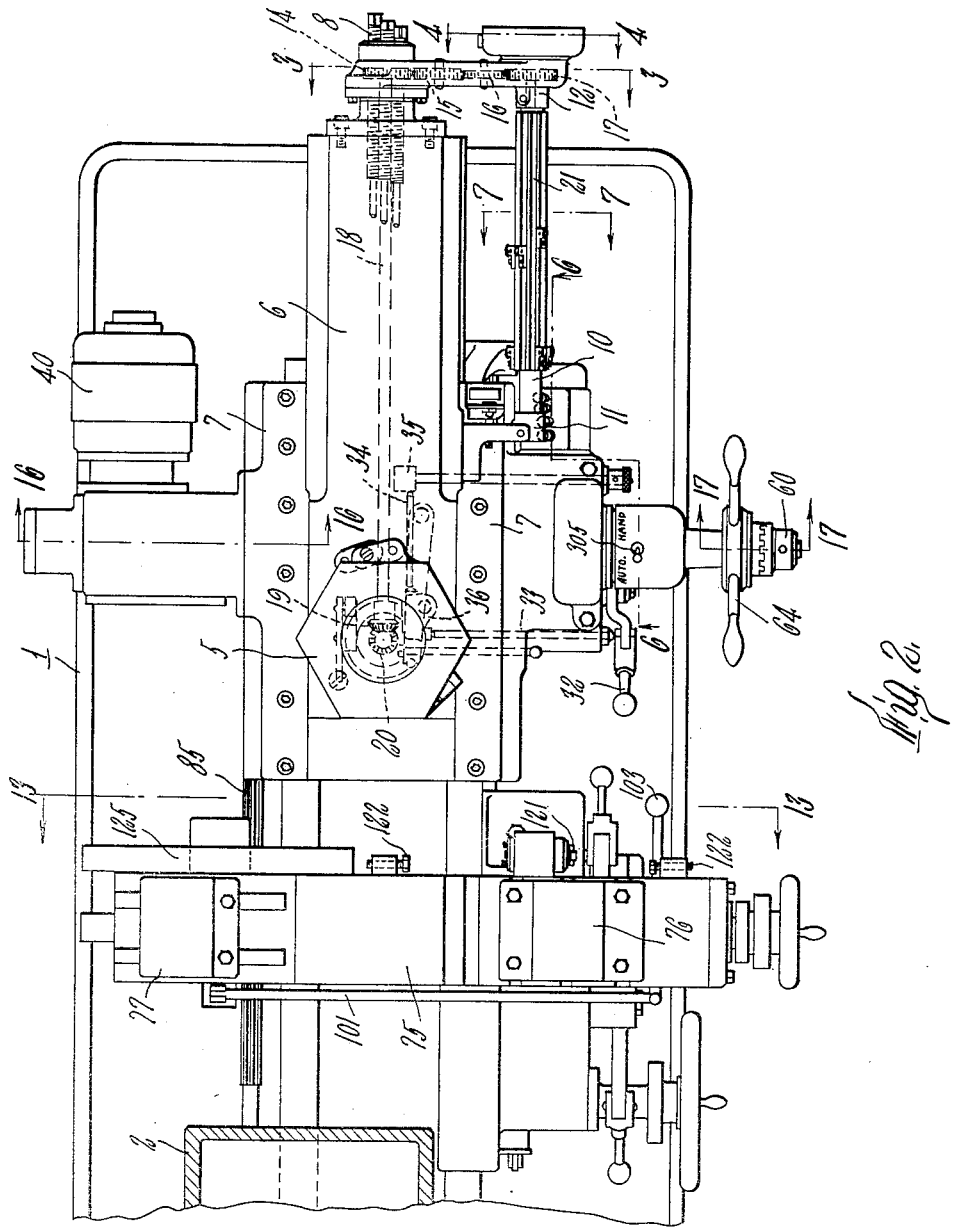

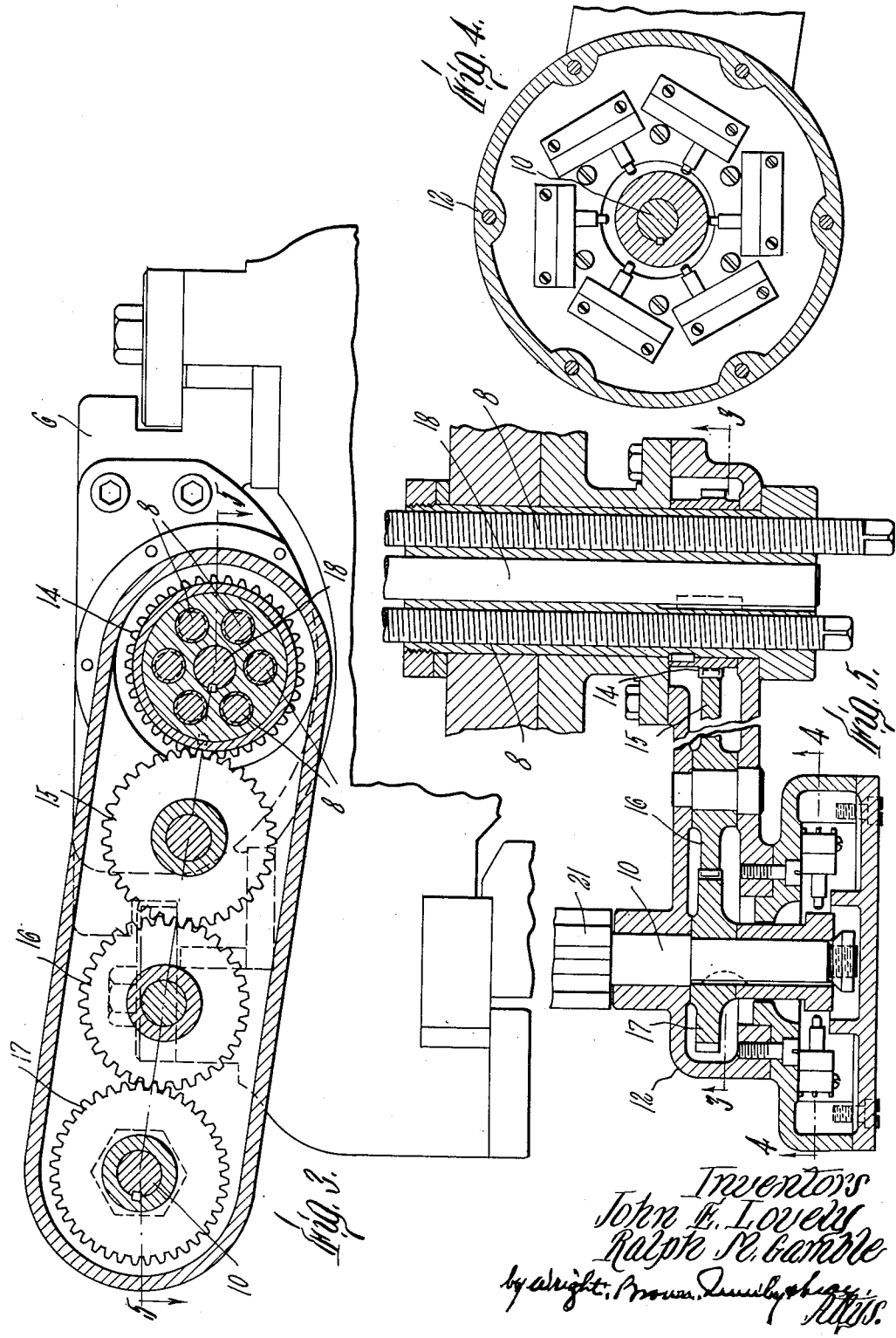

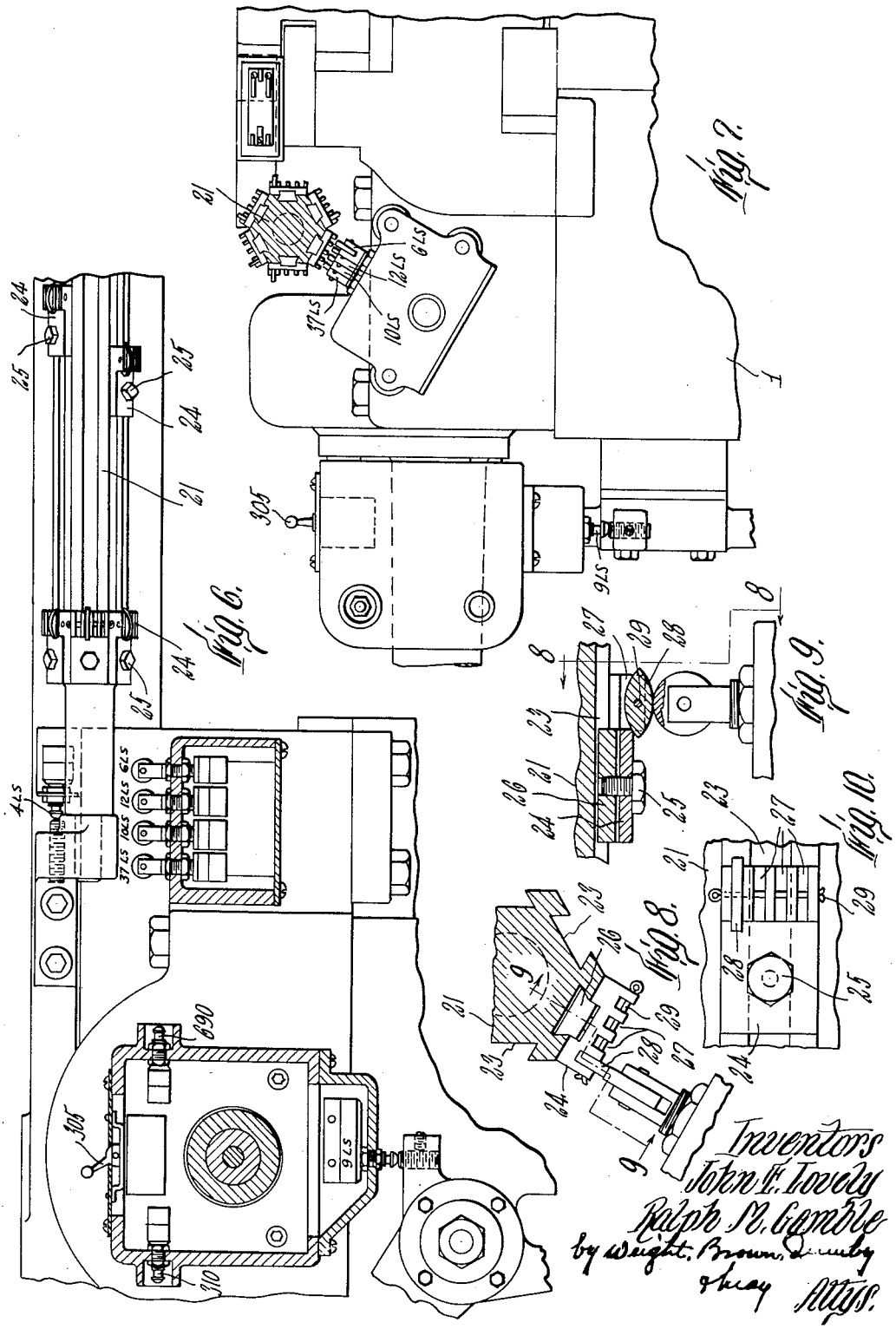

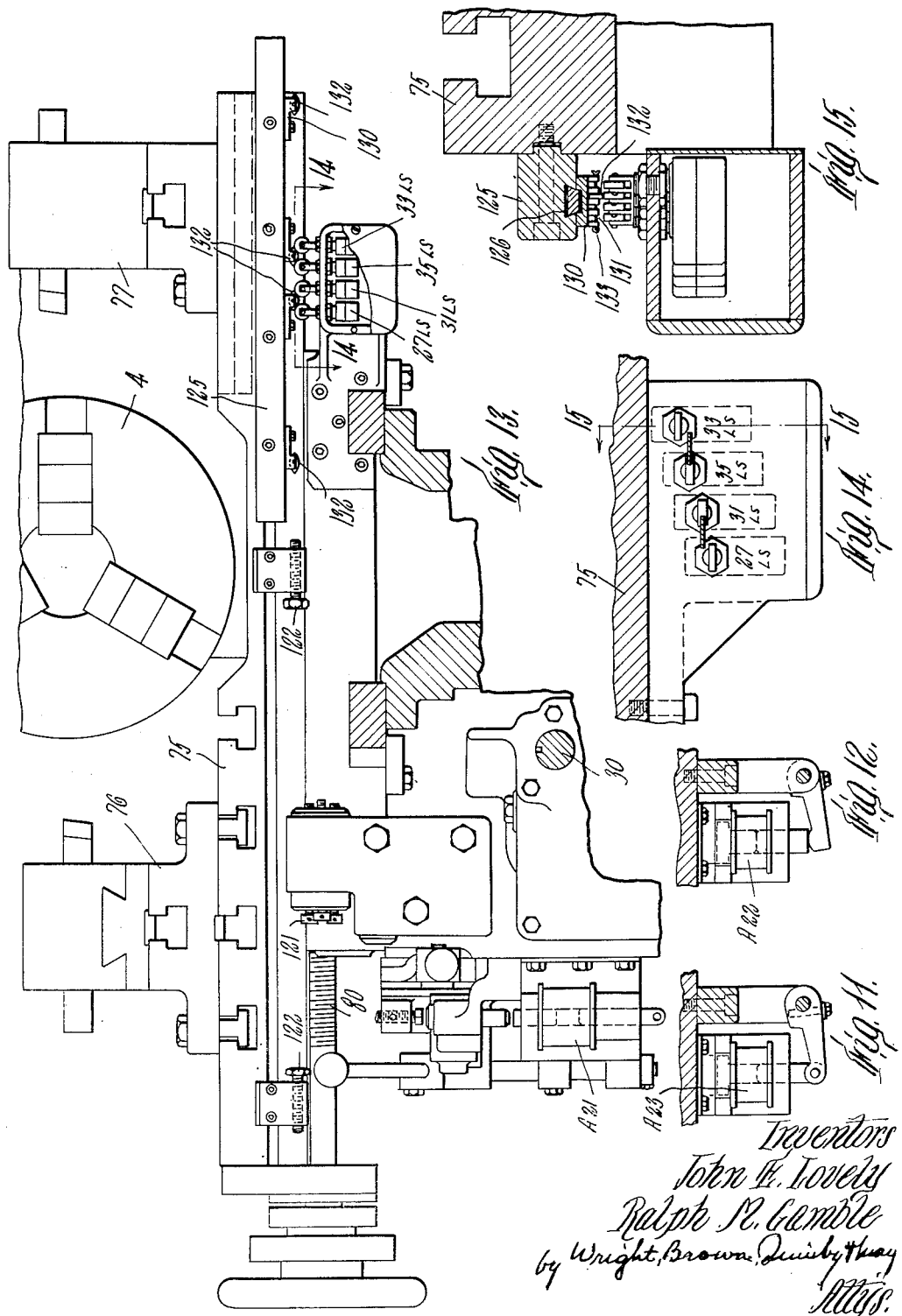

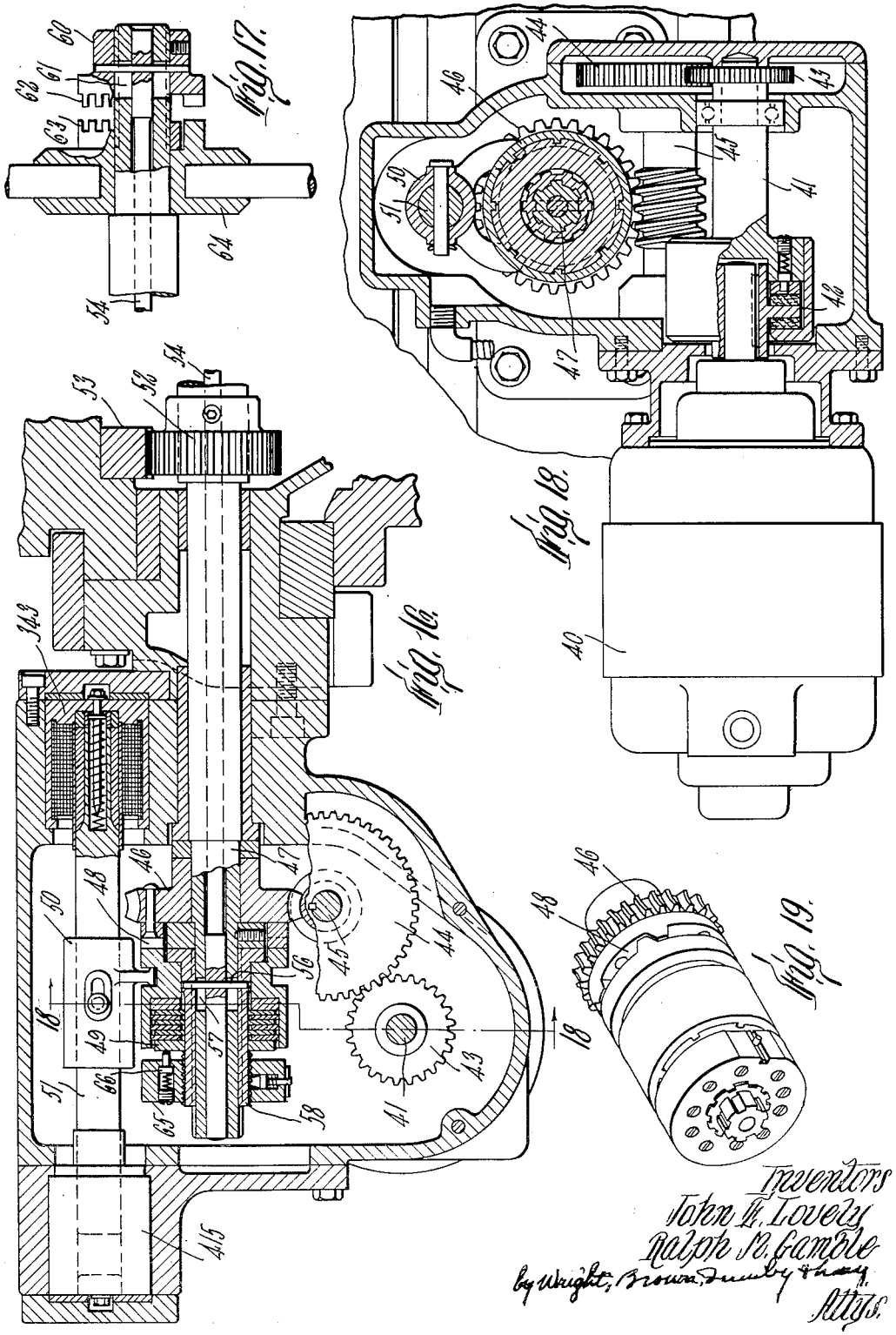

April 15, 1952     J. F. LOVELY ET AL     2,592,920
LATHE
Filed Aug. 14, 1945     8 Sheets-Sheet 7
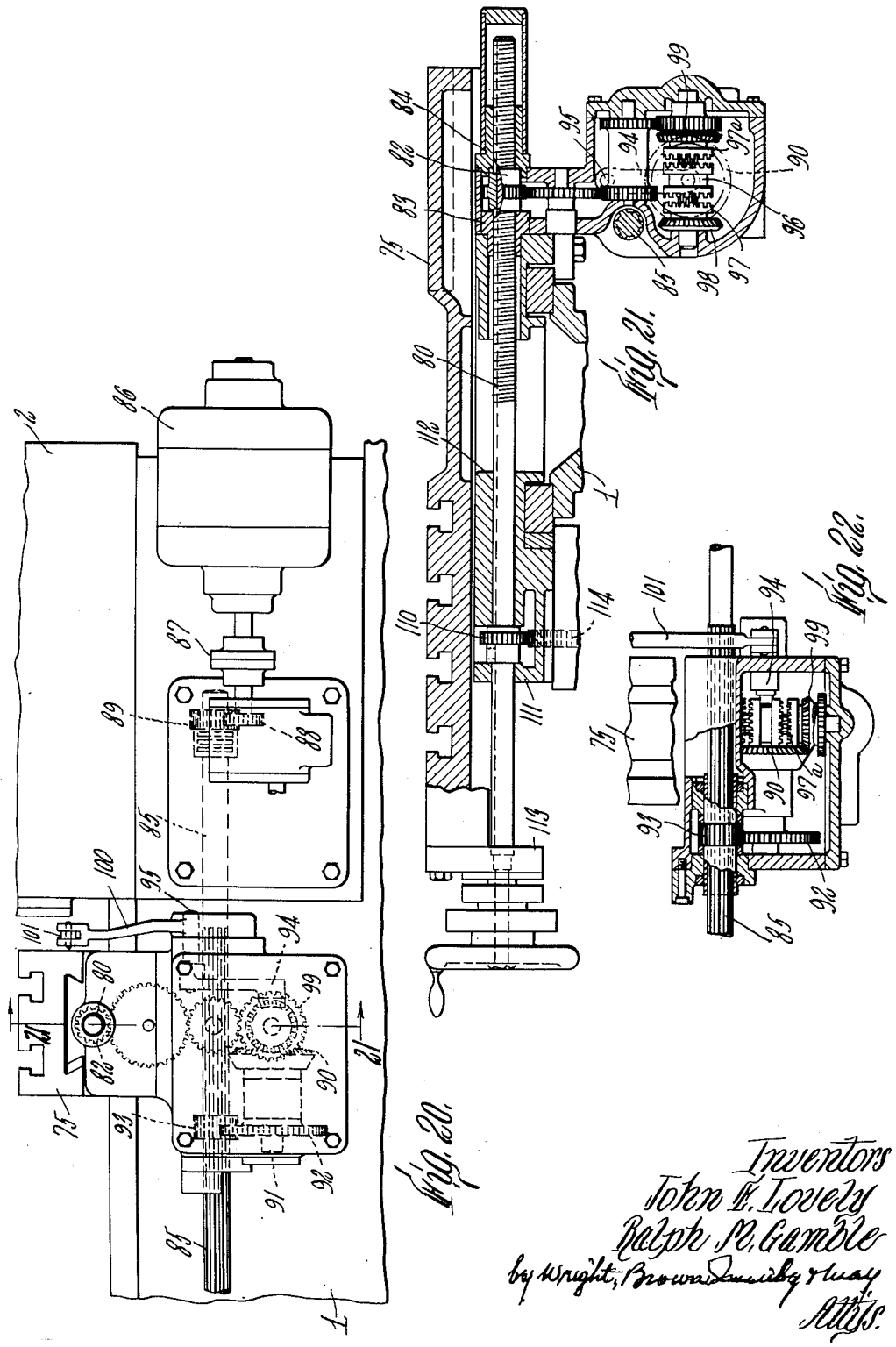
Inventors
John F. Lovely
Ralph M. Gamble
by Wright, Brown, Quinby & May
Attys.

April 15, 1952 J. F. LOVELY ET AL 2,592,920
LATHE
Filed Aug. 14, 1945 8 Sheets-Sheet 8

Inventors
John F. Lovely
Ralph M. Gamble

Patented Apr. 15, 1952

2,592,920

UNITED STATES PATENT OFFICE 2,592,920

LATHE

John E. Lovely and Ralph M. Gamble, Springfield, Vt., assignors to Jones & Lamson Machine Company, Springfield, Vt., a corporation of Vermont Application August 14, 1945, Serial No. 610,722

17 Claims. (Cl. 29—46)

There are many instances where a plurality of operations are to be performed on a workpiece and where the performance of all of these operations automatically would involve undesirable large tooling expense, though some of them could be so operated advantageously.

It is an object of the present invention, therefore, to provide for automatic operation of those operations which can be advantageously so performed and to provide for manual control of the remainder.

A further object of the invention is to provide for convenient and easy change-over between automatic and operator-controlled operations at any desired portion or portions of the complete machining cycles.

Still another object is to provide for operator-controlled interruption and resumption of the automatic control whenever desired.

A further object is to provide for automatic separation of the tools from the work at the last portion of an automatic operation cycle when desired.

Another object is to permit the operator to stop the automatic operating cycle at any point desired and to resume either automatic or operator-controlled operations thereafter at will.

Another object is to provide in a machine having a predetermined number of machine operating sequences, means for passing over with minimum delay any of such sequences which are not to be used in any particular machine set-up.

Another object is to provide a turret lathe whereby operations equal to or less in number than the turret faces and optional with at least two carriage operations may be performed automatically, or partly automatically and partly by hand control.

A further object is to provide means for attaining the foregoing objects by mechanism applicable to machines already known.

Further objects and advantages will appear from a description of an embodiment thereof as shown in the accompanying drawings in which Figure 1 is a front elevation of a turret lathe embodying the invention.

Figure 2 is a fragmentary top plan view of the same.

Figures 3 and 4 are detail sectional views on lines 3—3 and 4—4, respectively, of Figures 2 and 5 and on a larger scale than Figure 2.

Figure 5 is a detail sectional view on line 5—5 of Figure 3.

Figures 6 and 7 are detail sectional views on lines 6—6 and 7—7, respectively, of Figure 2.

Figure 8 is a detail sectional view on line 8—8 of Figure 9.

Figure 9 is a detail sectional view on line 9—9 of Figure 8.

Figure 10 is a fragmentary elevation of a switch-actuated dog and its mounting shown in Figures 8 and 9.

Figure 1:
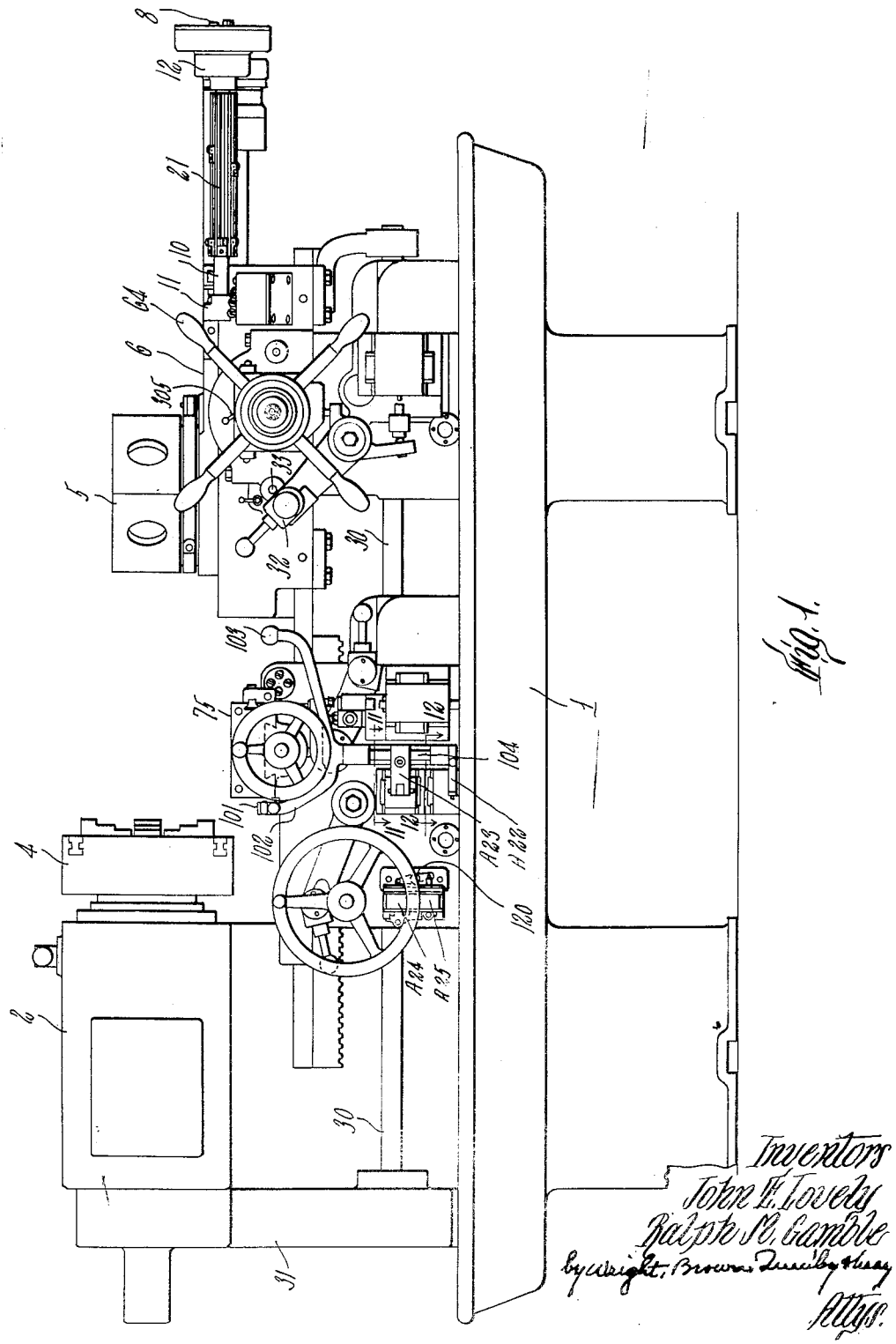

Figures 11 and 12 are detail sectional views to a larger scale on lines 11—11 and 12—12, respectively, of Figure 1.

Figure 13 is a detail sectional view on line 13—13 of Figure 2.

Figure 14 is a detail sectional view to a larger scale on line 14—14 of Figure 13.

Figure 15 is a detail sectional view on line 15—15 of Figure 14.

Figures 16 and 17 are sectional views to a larger scale on lines 16—16 and 17—17, respectively, of Figure 2.

Figure 18 is a sectional view on line 18—18 of Figure 16.

Figure 19 is a perspective view of the clutch and worm portion of the turret feed mechanism.

Figure 20 is a fragmentary rear elevation of the machine showing the high speed carriage feed mechanism.

Figure 21 is a detail sectional view on line 21—21 of Figure 20.

Figure 22 is a view partly in top plan and partly broken away of the high speed reverse gear box shown in Figures 20 and 21.

Figure 23:
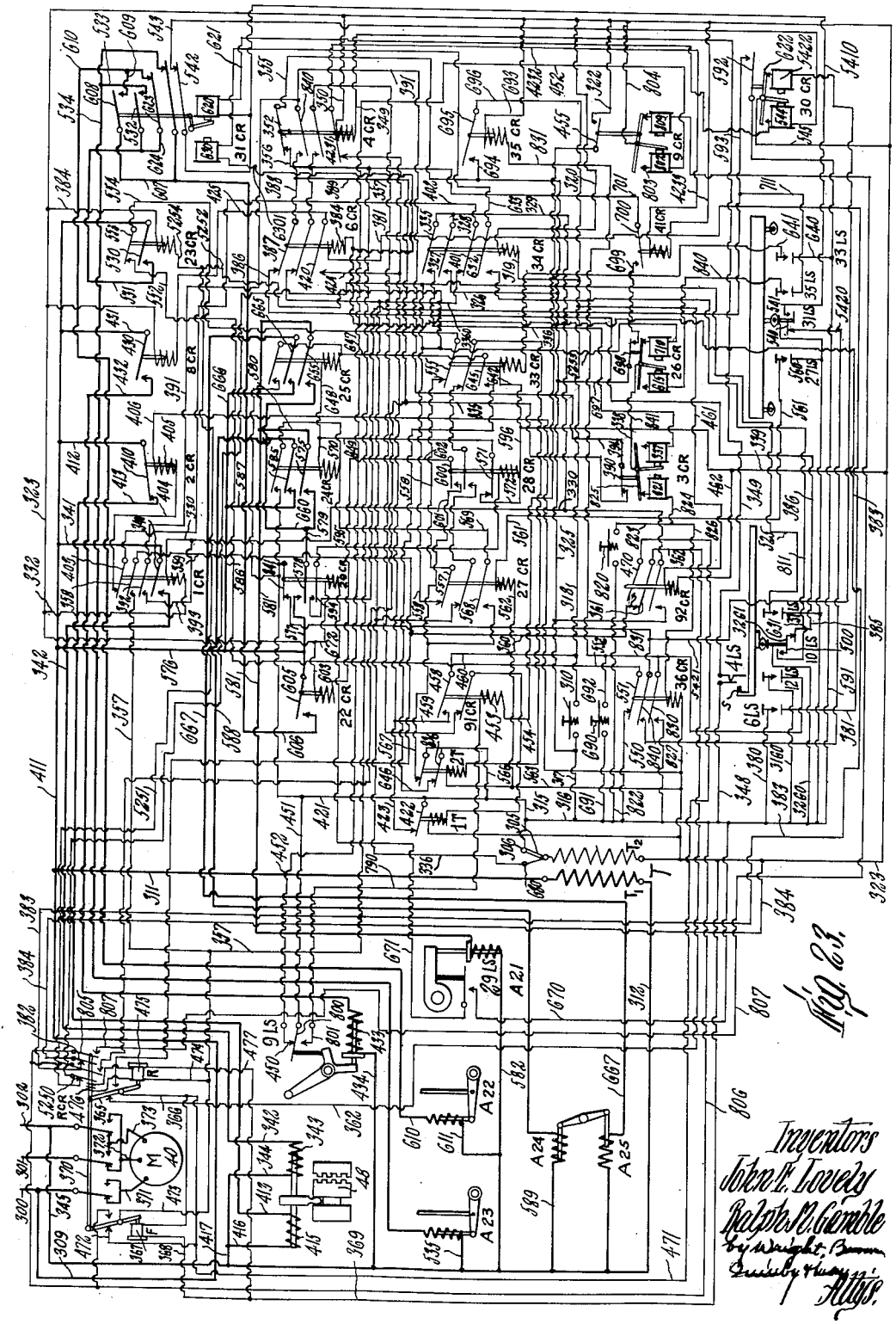

Figure 23 is a wiring diagram of the machine.

As shown the invention is embodied in a turret lathe of the ram type and provided with a cross slide. The machine comprises a bed 1 having at one end a headstock 2 in which is mounted a work spindle of any suitable construction, provided with a work-holding chuck 4. Certain of the tools are carried by a turret 5 mounted for indexing motion on a vertical axis on a ram 6, which is mounted for motion longitudinally of the axis of the work spindle between guides 7 as shown best in Figure 2. As shown this turret 5 is hexagonal and has six faces for supporting tools (not shown). Suitable means are provided by which, when the turret is retracted, it is indexed at the last portion of its retracted motion so as to bring the tools on the turret in sequence into operative position, as is well known in the art. This means, for example, may be that shown in the Lovely and Cheever Patent No. 2,094,993 granted October 5, 1937, for Lathe.

The limits of retraction of the ram at each actuation may be independently determined by axially adjustable stops 8 which are rotated in time with the indexing of the turret. The ram, in accordance with this invention, is provided with a control mechanism movable axially therewith and also indexed with the indexing of the turret. This comprises a lay shaft 10 journaled at its ends in suitable bearings 11 and 12 projecting forwardly from the ram, the bearing 12 being also a housing for the reception of a train of gears 14, 15, 16 and 17, the gear 14 being carried by a shaft 18 extending longitudinally of the ram and connected to the turret through the bevel gears 19 and 20. Thus as the turret is indexed, the shaft 18 is also indexed and this indexing motion is also communicated to the lay shaft 10. The gear train is so arranged that the lay shaft 10 rotates once for each complete rotation of the turret. The lay shaft carries a sleeve 21 which is provided with six faces, one corresponding to each turret face, and having dovetail slots 23 in each for the longitudinal adjustable attachment thereto of cam carriers 24 which may be secured to the sleeve 21 by bolts 25 threaded into dovetail shoes 26 riding in the grooves 23. Each cam carrier 24 of the lay shaft as shown best in Figure 8 has four spaced slots 27 within any selected of which a cam dog 28 may be secured as by a pin 29 which extends across all four of the slots. In line with the four slots of that cam carrier 24 on the lay shaft which is in operative angular position are four electric switches 37LS, 10LS, 12LS and 6LS (see Figure 6) which are actuated by a dog 28 in the corresponding slot of a lay shaft cam carrier.

LAY SHAFT AND RAM CONTROLLING MECHANISM

The longitudinal motion of the turret ram is produced by either of two mechanisms. The slow or working speed of this ram is derived from the rotation of the usual feed rod 30 extending longitudinally along the front of the machine. Commonly this feed rod is rotated by the same mechanism which rotates the work spindle by a suitable train of gearing which may be placed within the casing 31, as shown at the headstock end of the machine. As will later be pointed out, however, it may be rotated independently of the headstock where it is desired to control the rates of rotation of the work spindle and the feed rod independently of each other. The driving connections between the feed rod 30 and the ram may be the same as illustrated in the Lovely Patent No. 2,056,792 granted October 6, 1936, for Lathe and the Like Speed Control Mechanism, or, if desired, an electrically actuated gear shift such as is shown in the abandonded application for United States Letters Patent of Ralph M. Gamble, Serial No. 555,811, filed September 26, 1944, for Speed Controlling Mechanism for Machine Tools, may be substituted in place of the hand operated shift shown in that patent, operating on the same shift rods shown in the Lovely patent and numbered therein 199 and 230, respectively.

The driving connections also include knock-off mechanism as shown in the Lovely patent and indicated on Figures 1 and 2 at 32. Such knock-off mechanism, as shown in the Lovely patent, includes a movable member which may be latched in position to operatively connect the slow feed drive to the ram, this member being biased to a position to operatively disconnect the drive from the ram so that such disconnection is effected automatically on release of the latch.

The knock-off release herein shown is effected by axial motion of a rod 33 (see Figure 2) operated by a lever 36, which, in turn, is actuated through a push rod 34 from a movable abutment 35 arranged in the path of motion of the particular stop 8 which happens to be in line therewith corresponding to the angular position of the turret at any actuation, this determining the limit of forward travel of the turret for any turret position.

Beside the normal feed motion of the turret ram, a fast motion or idle speed drive is also provided, this being driven by a separate motor 40 (see Figures 2 and 18). Referring to Figures 16 to 18, the motor 40 drives a shaft 41 through a friction coupling at 42, the shaft 41 connected through intermeshing gears 43 and 44 with a worm shaft 45. This drives a worm wheel 46 journaled on a shaft 47 and connected thereto through a toothed clutch 48 which has interposed between its driven member and the shaft 47, a friction drive 49. This clutch is adapted to be opened or closed by the axial motion of a sleeve 50 mounted with lost motion connection on an axially movable rod 51 which forms the core for a pair of solenoids 343 and 415, energization of the solenoid 343 acting to clutch the worm wheel 46 to the shaft 47, and energization of the solenoid 415 acting to release this clutch. The shaft 47 has fixed thereto a gear 52 meshing with a fixed rack 53 on the machine frame. The shaft 47 is shown as hollow and extending therethrough is a clutch controlling rod 54 connected through a cross pin 56 passing through a slot 57 in the shaft 47 to the clutch sleeve 58 to which the outer end of the shaft 47 is splined. By pushing backwardly on the rod 54, or to the left as shown in Figures 16 and 17, the clutch 48 is disconnected. This may be done by pressing rearwardly a clutch knob 60 pinned to the forward end of the rod 54, the pin passing through a slot 61 in the forward end of the shaft 47. The clutch teeth 62 of the knob 60 are by this action pressed into engagement with mating teeth 63 on the hub of a hand wheel 64, by the rotation of which the shaft 47 may be turned, thus to produce an axial motion of the turret ram by hand, as for setting up the machine. The friction drive between the movable clutch elements of the clutch 48 serves to cushion the shock when the clutch is thrown into action. The friction clutch is normally held in adjustable frictional engagement by a collar 65 threaded onto the rear end of the shaft 47 and having spring pressed abutments 66 engaging the outer portion of the friction drive.

As will later more fully appear, actuation of the switch 37LS starts the motion of the cross carriage either forwardly or backwardly. Actuation of the switch 10LS stops the motion of the ram in loading position. Actuation of the switch 12LS reverses and returns the ram to starting position in order to skip a turret station, and actuation of the switch 6LS stops the forward fast motion of the ram and puts it into slow working feed, but is inoperative on return motion of the ram. There is also a switch 4LS which is actuated by a stop S carried by the ram at the limit retire position of the ram, the actuation of which returns the ram in fast forward motion except when the carriage is out of mid-position, in which case its actuation stops the ram in fully retracted position, as will be more fully described under the heading "Ram and Carriage Interlock."

TOOL CARRIAGE CONTROLLING MECHANISM

Referring particularly to Figures 1, 2, 13 and 20 to 22, there may be employed in this machine beside the turret, a cross slide carriage 75 which is mounted for front and back motion between the turret and the face of the spindle. This slide may carry a pair of tool supports 76 and 77, the arrangement being such that the tool on the front tool support 76 may be brought in toward the work, first at a rapid rate and then at a slow cutting rate, while at the same time the rear tool support is moving away from the work, and when this operation has been completed, the carriage may be moved in the opposite direction to withdraw the front tool support 76 from the work and to bring the rear tool carrier 77 toward the work, whereupon the carriage may be thrown into working speed in the same direction to cause the rear tool or tools to act upon the work. This forward and rearward motion of the carriage 75 is produced by relative rotation between a lead screw 80 and a nut 82, as shown best in Figure 21.

The fast motion of the carriage is produced by rotation of the nut 82 and the slow or feed motion is produced by rotation of the screw 80. The nut 82 is held against axial motion with reference to the machine frame, being positioned between spaced shoulders 83 and 84 carried by the frame. The rotation of the nut 82 is produced by the rotation of a splined shaft 85 positioned longitudinally of the machine at the back, this being driven by a motor 86 positioned back of the headstock.

As shown best in Figure 20, the motor 86 is connected as through a coupling 87 and a gear train comprising gears 88 and 89 and a friction slip connection with the splined shaft 85. The motor 86 rotates in one direction only, but motion is communicated from it to the nut 82 in either direction, depending upon the axial position of a clutch collar 96 having oppositely disposed clutch faces which may be engaged with either of a pair of mating clutch elements 97 and 97a. The clutch collars 97 and 97a are driven in opposite directions, being connected to be rotated in such directions by bevel gears 98 and 99 which mesh with a bevel gear 90 (see Figures 20, 21 and 22) on a shaft 91 to which is fixed a gear 92 meshing with a pinion 93 carried by the splined shaft 85. The clutch collar 96 is arranged to be thrown to either of its two positions by the swinging of a lever 94 carried by a rock shaft 95 to which is also attached an arm 100 to which an actuating link 101 projecting to the front face of the machine is pivotally mounted. To the forward end of link 101 is pivoted a hand actuating lever 102 having a handle 103 by which it may be actuated by hand when desired. This hand lever 102 is fixed to a vertical pivot shaft 104 (see Figure 1) and this is arranged to be actuated electrically by the machine controls, as will later appear, by a pair of solenoids A23 and A22 (see also Figure 23).

The working or slow feed motions of the carriage transversely are derived from the headstock spindle. A portion of this mechanism is shown in Figure 21, the lead screw 80 having splined thereon a gear 110 held between fixed frame portions 111 and 112 against axial motion, but by the turning of which the screw 80 is rotated. This screw is secured for rotation, but against axial motion with reference to the carriage 75 in the forward apron portion 113 thereof in the well known manner. This gear 110 may be driven by a suitable gear train, including a gear 114 and a reverse mechanism which may be identical with that shown in the Lovely Patent No. 2,056,792 granted October 6, 1936, for Lathe and the Like Speed Control Mechanism, the reverse motion control of which is effected by the rocking of a handle marked 255 in the Lovely patent projecting from the forward face of the cross slide apron 11 shown in that patent. For the purposes of the present invention the rock shaft 120 to which the reverse actuating handle is attached, is rocked to determine the direction of motion of the slow speed drive by a pair of solenoids A24 and A25 (see Figures 1 and 2).

The carriage 75, as shown best in Figures 13 and 15, carries a bar 125 having a dovetail slot 126 in its lower face for the longitudinally adjustable attachment thereto of a plurality of dog carriers 130 similar to the carriers 24 of the lay shaft. Each carrier 130 has four laterally spaced slots 131 in any selected one of which a switch actuating dog 132 may be positioned on the cross pin 133. The slots 131 are in line with four stationary switches 27LS, 31LS, 35LS and 33LS. As will later be more fully explained, actuation of the switch 27LS causes forward working feed of the carriage after an initial rapid idle forward feed started by actuation of the ram-actuated switch 37LS. Actuation of the switch 31LS stops the carriage in mid-position after it has been returned from either its forward or backward motions. Actuation of the switch 35LS re-sets a ram interlock relay 26CR, allowing the ram cycle to resume if the ram has been held retracted awaiting completion of the carriage operation. Actuation of the switch 33LS transfers from rapid advance to feed of the carriage in each direction of motion from mid-position.

CYCLE DIAGRAM OF AUTOMATIC AND HAND CONTROLS

Automatic ram control

At the start of the cycle the ram has moved forward to bring the tool or tools on the turret part way toward the work so that the switch 10LS is closed as shown in Figure 23. Assuming that the machine is on the automatic cycle, the switch 305 is closed to the contact 306, this being the automatic cycle position. Low voltage is derived from the secondary of the transformer T, the primary of which is energized from the power lines 300 and 302 through the leads 309, 311, transformer primary T1 and lead 312. The various switches and relays are in the position shown in Figure 23. The main switch energizing the lines 300, 301, and 302 being closed, the motor 40, which is to move the ram in fast motion, is rotating in forward direction, that is, in the direction to move the ram toward the headstock, but the clutch 48 is open so that the ram is stationary.

The machine cycle is started by pressing the starting press cycle button switch 310. This closes the circuit from the upper terminal of the transformer secondary T2 through leads 315, 316, and 317, starting switch 310, leads 318 and 319, coil of the relay 34CR, leads 320 and 323 to the lower end of the transformer secondary T2. Energization of the coil of the relay 34CR closes three contacts and breaks one. Closing of the switch contact 327 of the relay 34CR closes a circuit from the transformer secondary T2 through leads 315, 316, 317, 325, 326, switch 327, leads 328, 329, 330, coil of the relay 1CR, leads 332 and 323, back to the transformer secondary T2. A second switch closed by the energizing of the relay 34CR is the switch 335 which energizes the coil of the relay 3CR from the transformer secondary T2 through leads 315, 316, 317, 325, 326, closed switch 335, lead 3361, coil 337 of the relay 3CR, and leads 338, 339 and 323 back to the transformer secondary T2. The relay 3CR is now conditioned for the start of a cycle of operations. Energization of the relay 1CR closes three switches and breaks one. One of the switches of relay 1CR at 392 closes two parallel circuits which maintain the coil of the relay 1CR energized after the starting switch 310 has been released and there so maintain it through the fast motion portion of the ram cycle. One of these circuits is from the transformer 4CR (which is now deenergized), lead 391, closed switch 10LS, leads 385, 386, closed switch 387 of the relay 6CR, closed switch 840 of the relay 4CR, (which is now deenergized) lead 391, closed switch 392 of relay 1CR, leads 393 and 330, coil of the relay 1CR and leads 332 and 323, back to the secondary of the transformer T. The other of these circuits goes to the relay 3CR, in place of the relay 4CR, from the switch 387 of relay 6CR, through leads 388, 389, 835, closed switch 390, and lead 391 to the closed switch 392 of the relay 1CR. Closing of one of the switches of relay 1CR at 340 closes power connection from the line 300 through leads 309, 411, 341, switch 340, lead 342, the high speed clutch closing coil 343, leads 344 and 345 to the line 302. Energizing of the coil 343 closes the clutch 48 so that the ram starts forward, that is, toward the headstock, in fast motion, bringing the tool or tools carried by the turret near to the work until a dog 28 on the ram contacts and closes the switch 6LS which throws out the fast motion and throws in the slow or working feed. Closing the switch 6LS closes a circuit from the transformer secondary T2 through leads 315, 316 and 380, switch 6LS, lead 381, coil of the relay 6CR, leads 383, closed switch 382, leads 384 and 323 back to the transformer secondary T2. Energization of the relay 6CR closes one switch and opens two switches. One of these opened switches interrupts a circuit from the transformer secondary T2 through leads 315, 316, 3260, closed switch 10LS, lead 385, 386, open switch 387, of the relay 6CR, leads 388 and 389, 385, closed switch 390 (relay 3CR coil 337 being energized), lead 391, switch 392 of the relay 1CR, leads 393 and 330, coil of the relay 1CR, leads 332 and 323 and back to the transformer secondary T2. This deenergizes the coil of the relay 1CR, opening the circuit through the solenoid 343 of the high speed clutch. The deenergization of the coil of the relay 1CR closes a switch at 403 which closes a circuit from the transformer secondary T2 through switch 305, now closed manually to the terminal 689, leads 336, 3360, closed switch 401 of the relay 34CR, lead 402, closed switch 403 of the relay 1CR, lead 404 to the coil 405 of the relay 2CR and leads 406, 827, and 323 back to the transformer secondary T2. This switch 401 is the third switch of the relay 34CR closed when the relay 34CR was energized as previously described. Closing of the relay 2CR closes the switch 410. Closing of the switch 410 closes a circuit from the power line 300 through leads 411 and 412, closed switch 410 of the relay 2CR, lead 413, solenoid 415, leads 416, 417 and 345 to the line 302. Energization of the solenoid 415 opens the fast motion clutch. Closing of the relay 6CR also throws in the slow feed of the ram. This is accomplished by the closing of the switch 420 of the relay 6CR which closes a circuit from the transformer secondary T2 through leads 315 and 421, the normally closed switch 422 of the time delay relay 1T, leads 423 and 424, closed switch 420 of the closed relay 6CR, lead 425 to the coil of the relay 8CR and out through the return lead 323 to the transformer secondary T2. Energization of the coil of the relay 8CR closes a switch 430 which closes a power line circuit from line 300 through leads 411 and 431, closed switch 430 of the relay 8CR, lead 432, time delay solenoid 433 of the slow feed lever switch 9LS, leads 434 and 345 back to the line 302. The closing of the slow feed lever closes a circuit through the switch 800 which closes a circuit from the transformer secondary T2 through leads 315, 421 and 451, switch 800, leads 450, 452, and 801, coil 802 of the relay 9CR, leads 803, 804 and 323 to the transformer secondary T2. This conditions the relay 9CR for subsequent actions. The slow feed lever of switch 9LS is latched in operative position so that as the ram proceeds in its cutting stroke and breaks contact at 6LS, the slow feed continues even though the mechanism by which it was placed in slow feed position becomes deenergized. This slow feed continues until the feed lever is automatically released mechanically by release of the knock-off at the end of the cutting stroke. This release closes a switch 800 to contact 801 of the double switch 9LS, causing reversal of the direction of rotation of the high speed motor 40 after a time delay and the re-engagement of its clutch connection 48 to the ram. The closing of the switch 800 to contact 801 closes a circuit from the transformer secondary T2 through leads 315, 421 and 451, switch 800 of the double switch 9LS, contact 801, lead 790, coil 453 of the relay 91CR, lead 454, closed switch 455 of the relay 9CR and leads 322 and 323 back to the transformer secondary T2. Closing of the relay 91CR breaks one circuit and makes another circuit. Making of the circuit through the switch 458 of the relay 91CR closes a circuit from the transformer secondary T2 through lead 315, switch 422, leads 423, 459, closed switch 458 of the relay 91CR, leads 460, 318 and 461, coil of the relay 92CR, and leads 462 and 323 back to the transformer secondary T2. Closing of the relay 92CR closes two circuits and breaks one. One of the circuits closed is at the switch 470 from the transformer secondary T2 through leads 315, 316, 317, 325, 355, switch 352, leads 356, 357, switch 358 of the relay 1CR, leads 359, 360, switch 470 of relay 92CR, lead 471, closed switch 472, leads 473 and 474, solenoids 475 and 476 in parallel, leads 477, 369 and 323 back to the transformer secondary T2. Energization of the solenoids 475 and 476 reverses the motor switch 370. The ram thus retires under fast motion. The motor reversal arm 370, when the motor is reversed, closes a switch 805 which closes a circuit from the transformer secondary T2 through leads 315, 316 and 806, switch 805, lead 807, coil 809 of the relay 9CR and leads 804 and 323 to the other side of the transformer secondary T2. This conditions the relay 9CR for succeeding operations, including the succeeding forward drive of the motor 40. Just before the ram reaches its outer limit, that is, away from the headstock, the lay shaft indexes mechanically as previously described. At its limit of retirement the ram opens the switch 4LS by impingement thereon of a ram-carried stop screw S (Figure 6) which deenergizes the solenoid of relay 4CR. The time delay relays at 1T and 2T are energized by switches on the relay 4CR and act to hold their respective switch arms open for the desired time after current through their actuating solenoids has been interrupted by opening the corresponding switches of the relay 4CR. The motor 40 then starts in fast motion forward and a new cycle begins so long as the cycle has not been stopped by motion of the carriage. (See Ram and Carriage Interlock.) Each time the ram retracts it indexes the lay shaft and turret until both reach the first index position.

When this first index position is reached, the ram starts forward under high speed to loading position and when contact of its dog 28 with the switch 10LS is made, the ram stops. Contact with the switch 10LS closes one switch and breaks another switch. The closing switch resets the mechanism for the carriage control as will later appear. The opening of switch at 500 de-energizes the coil 343 of the fast motion clutch and energizes the coil 415 of this clutch, which opens this clutch and stops the motion of the ram. This is accomplished as follows. The opening of the switch at 500 breaks a circuit from the transformer secondary T2 through leads 315, 316, 3260, open switch 500 of switch 10LS, lead 385, lead 386, closed switch 387, leads 388 and 389, 835, closed switch 390, lead 391, closed switch 392 of relay 1CR, leads 393 and 330, the coil of relay 1CR, leads 332 and 323 to the other side of the transformer secondary T2. De-energization of the relay 1CR de-energizes the clutch coil 343 as follows.

De-energization of the coil of the relay 1CR opens a circuit at the switch 340 from the power line 300 through leads 411, 341, open switch 340, lead 342, solenoid 343, leads 344, 417 and 345 to the line 302. De-energization of the relay 1CR also closes a switch 403 which closes a circuit from the secondary of the transformer T2 through leads 315, 336, closed switch 401 of the relay 34CR, lead 402, closed switch 403 of the relay 1CR, lead 404, coil 405 of the relay 2CR, leads 406 and 323 back to the secondary of the transformer T2. Energization of the relay 2CR closes a switch 410, closing a circuit from the power line 300 through lead 411, 412, closed switch 410, lead 413, clutch opening solenoid 415, leads 416 and 417, 345, to the power line 302.

The ram is now stopped for loading but is in condition to be started in automatic cycle by pushing the cycle start button 310.

TURRET SKIP

If it is desired to skip any turret position, it is only necessary to position a dog to engage the switch 12LS for that particular lay shaft position when the forward fast motion of the ram has proceeded only sufficiently to clear the indexing mechanism. Thus, at this station the forward slow motion is eliminated and the ram starts back and acts immediately to index to the next following turret and lay shaft position. Closing of the switch 12LS establishes a circuit from the secondary of the transformer T2 through leads 315, 316, 3160, switch 12LS, lead 831, coil of relay 35CR, lead 693, lead 323, back to the secondary of the transformer T2. Energizing of the coil of the relay 35CR closes a circuit from the transformer secondary T2 through leads 315, 316, 317, 325, 694, closed switch 695 of the relay 35CR, leads 696 and 461, coil of the relay 92CR, and leads 462, 329 and 323 back to the transformer secondary T2. Closing of the relay 92CR retires the ram at high speed as previously described under "Automatic Ram Control."

HAND CONTROL OF RAM FEED

When it is desired to control the feed of the turret tools by hand, a cam is set on the ram for that turret position to engage the switch 10LS at the end of the rapid approach of the ram toward the headstock. The closing of this switch stops the automatic cycle. The feed may then be done by hand control of the mechanical feed means.

RETIRE CYCLE START

The cycle may be resumed at any time after hand feed by depressing the retire cycle start button 690 which acts to retire the ram which thereafter resumes its automatic cycle. By closing the retire start button 690, a circuit is made from the transformer secondary T2 through leads 315, 316, 691, closed switch 690, lead 692, coil of the relay 35CR, leads 693, and 323 back to the transformer secondary T2. Energizing the coil of the relay 35CR closes a circuit from the transformer secondary T2 through leads 315, 316, 317, 325, 694, closed switch 695 of the relay 35CR, leads 696 and 461, the coil of the relay 92CR, and leads 462, 339 and 323 back to the transformer secondary T2. Closing of the relay 92CR retires the ram at high speed as previously described under "Automatic Ram Control." At its retire limit the ram opens the switch 4LS, the parts then being in condition so that the opening of this switch starts the ram in forward fast motion of the automatic cycle.

AUTOMATIC CARRIAGE CONTROL

The carriage control for the front and back tools is initiated by the ram. When a switch 37LS is closed by a dog on the lay shaft at any angular position thereof, solenoid A23 is energized to throw in the fast speed forwardly for rapid approach of the front tools on the carriage toward the work. This is done by the closing of the switch 37LS, the circuit being from the transformer secondary T2 through leads 315, 316, 3160, switch 37LS, lead 525, closed switch 5250, lead 5251, 5254, solenoid of the relay 23CR, leads 384 and 323 to the other side of the transformer secondary T2. The closing of the relay 23CR closes two switches. One of these switches 530 closes a circuit from the power line 300 through lead 411, closed switch 530, lead 531, closed switch 532 of the relay 31CR, leads 533 and 534, solenoid A23, and leads 535 and 345 to the line 302. The switch 532 was previously closed by the carriage closing a switch 31LS when in its stopped centered position. Closing of the switch 31LS makes a contact at 540 and breaks a contact at 541. Closing of the contact at 540 closes a circuit from the transformer secondary T2 through leads 315, 316, 3160, closed contact 540 of the switch 31LS, lead 5420, switch 840 of the relay 36CR, lead 5421, coil 5422 of the relay 30CR and leads 545 and 323 back to the transformer secondary T2. Solenoid A23 when energized establishes the fast motion forward feed of the carriage (away from the operator). As the forward tool or tools on the carriage approach the work, a dog 132 on the carriage closes the switch 27LS which breaks the circuit to the fast motion solenoid A23, ready after a time delay to throw in the slow or working feed. Closing of the switch 27LS closes a circuit from the transformer secondary T2 through leads 315, 316, 3160, 560, closed switch 27LS, lead 561, coil of the relay 27CR, leads 562, 563 and 323 back to the transformer secondary T2. Energizing of the relay 27CR opens the switch 557 of this relay which opens the circuit to the solenoid A23. Energization of the relay 27CR also closes a switch 568. The closing of the switch 568 closes a circuit from the transformer secondary T2 through leads 315, 566, switch of relay 2T, 567, closed switch 568 of relay 27CR, lead 569, coil of the relay 24CR, lead 570, closed switch 571 of the relay 28CR, leads 572, 339 and 323 back to the transformer secondary T2. Closing of the relay 24CR closes the switch 575 which energizes the slow feed solenoid A21 after a time delay. Closing of the switch 575 closes a power circuit from the line 300 through leads 411, 576, 577, closed switch 578 of the relay 29CR, lead 579, closed switch 575 of the relay 24CR, leads 580 and 581, time delay solenoid A21 and leads 582 and 345 to the line 302. At the same time the forward time delay clutch solenoid A24 is closed. This solenoid A24 is energized by the closing of the relay 24CR through its switch 585, which closes a circuit from the power line 300 through leads 411, 576, 586 and 587, closed switch 585 of the relay 24CR, lead 588, solenoid A24 and leads 589 and 343 to the line 302. This condition persists until the limit of feed where a mechanical knock-off releases the feed lever. The limit of slow feed in each direction is controlled by the knock-off mechanism 121 which is struck by one or the other of the adjustable stop screws 122 carried by the carriage, the knock-off mechanism when actuated causing rapid return of the carriage to mid-position. This knock-off mechanism may be as shown in United States Letters Patent No. 2,094,995 granted October 5, 1937. The feed lever on being released falls and closes a switch 29LS which interrupts the circuit through the forward feed clutch closing solenoid A24. This is done by closing a circuit through the coil of relay 28CR which opens a switch arm 571, de-energizing the solenoid A24. The coil of the relay 28CR is closed from the transformer secondary T2 through leads 315, 316, 591, closed switch 592 of the relay 30CR, lead 593, closed switch 594 of the relay 29CR, lead 595, the coil of the relay 28CR, and leads 596, 339 and 323 to the transformer secondary T2. The carriage is now started in fast return motion by energization of the coil A22 by the closing of the switch 29LS, which closed the relay 28CR. Closing of the relay 28CR closes a switch 600 which closes a circuit from the transformer secondary T2 through leads 315, 566, switch of relay 2T, 567, 601, closed switch 600, lead 602, coil of the relay 22CR and lead 603 and 323 to the transformer secondary T2. Closing of the relay 22CR closes the switch 605. This closes a circuit from the power line 300 through leads 411 and 576, closed switch 605 of the relay 22CR, leads 606 and 607, closed switch 608 of the relay 31CR, leads 609 and 610, solenoid A22, leads 611, 582, and 343, back to the line 302. The carriage now returns at fast speed to its central position where a dog 132 thereon closes the switch 35LS, as noted under the heading "Carriage and Ram Interlock" and the motion of the carriage continues until another dog 132 thereon closes a switch 31LS at the central position. This stops the fast return of the carriage. As the solenoid A22 is de-energized by the closing of the switch 31LS, this leaves the carriage in its central position as it was when its motion was first started from the motion of the ram. Closing of the switch 31LS energizes the coil 620 of the relay 31CR, the circuit being from the transformer secondary through leads 315, 316, 3160, switch 31LS, leads 541 and 5410, coils 620 of the relay 31CR, lead 621, switch 622 of the relay 30CR and leads 545 and 323 back to the transformer secondary T2. Energizing of the coil 620 of the relay 31CR opens a switch 623 which breaks the circuit through the solenoid A22, the circuit being from the power line 300 through lead 411, closed switch 530 of the relay 23CR, leads 531 and 624, open switch 623, lead 610, solenoid A22, and leads 611 and 343 to the line 302.

On another face of the lay shaft is another dog 28 which trips switch 37LS again for the retire motion of the carriage to cause the rear tools on the carriage to operate on the work. When switch 37LS as well as the switch 31LS are closed, the high speed reverse travel of the carriage starts through the energization of the solenoid A22. This is accomplished by closing of the relay 23CR as described at the beginning of the first carriage moving cycle. Solenoid 630 of the relay 31CR is then energized from the transformer secondary T2 through leads 315, 316, 3260, closed switch 500 of the relay 10LS, lead 811, closed switch 632 of the relay 34CR, lead 633, coil 630 of the relay 31CR, leads 6301 and 383, switch 382 of relay RCR, lead 384 to lead 323, back to the transformer secondary T2. Closing of the relay 31CR closes a switch at 608. The rapid return solenoid A22 is now energized from the power line 300 through lead 411, 576, closed switch 605 of the relay 22CR, leads 606 and 607, closed switch 608, leads 609 and 610, solenoid A22, leads 611, 582 and 345 back to the line 302. The carriage now returns rapidly to bring its rear tools toward the work until a dog 28 closes the switch 33LS which de-energizes the solenoid A22, closes the clutch A25 and also after a time delay starts the slow feed through energization of the solenoid A21. Energization of the solenoid A21 is accomplished in the same way as previously described in connection with the forward slow feed. Solenoid A25 is energized as follows. The closing of the switch 33LS energizes the coil of the relay 33CR from the transformer secondary through leads 315, 316, 640, closed switch 33LS, lead 641, coil of relay 33CR and leads 642, 339, 323, back to the transformer secondary T2. Closing of the relay 33CR closes a switch 645 and opens two switches. The closing of the switch 645 closes a circuit from the transformer secondary T2 through leads 315, 566, closed switch 836 of time delay 2T, lead 646, closed switch 645, lead 647, the coil of the relay 25CR, leads 648 and 649, closed switch 571 of the relay 28CR, leads 572, 339 and 323, back to the transformer secondary T2.

Closing of the relay 25CR closes three switches. Closing of the switch 655 of the relay 25CR energizes solenoid A21 (power feed) closing a circuit from the power line 300 through leads 411, 576, and 577, closed switch 578 of the relay 29CR, leads 579 and 660, closed switch 655 of the relay 25CR, lead 581, coil on a time delay solenoid A21, leads 582 and 345 to the power line 302. The power feed reverse is also operated on time delay. Relay 25CR also closes a switch 665 closing a circuit through the solenoid A25 (feed reverse) from the power line 300 through leads 411, 576, 586 and 666, closed switch 665, lead 667, solenoid A25 to lead 345 back to the line 302. The carriage is now moving in power reverse feed until the mechanical knock-off 29LS is operated to disconnect this feed. After a time delay, contact is made at 29LS whereupon the fast forward feed solenoid A23 is energized to move the carriage forwardly in fast motion to the center of its stroke. Energization of the soleoid A23 is accomplished by circuit from the transformer secondary T through leads 315, 316, 670, closed switch 29LS, lead 671, coil of the relay 29CR, and leads 672 and 323, back to the transformer secondary T2. Energization of the coil of the relay 29CR makes a contact through switch 594. Closing of this switch 594 as described in connection with the first cycle of the carriage, closes switch arm 605 in the same circuit as the solenoid A23. It energizes the fast motion solenoid A23. At mid-position the carriage dog again closes the switch 31LS which de-energizes the solenoid A23 and stops the carriage motion as previously described. The carriage motion cycle is now complete.

RAM AND CARRIAGE INTERLOCK

The carriage can be started either at the end or the beginning of the ram feed, depending upon where the dog which trips the switch 37LS is placed, and when done at the beginning, the ram and carriage operate simultaneously. When the carriage is operating the ram stops when it opens the circuit at the switch 4LS at its extreme retired position and the ram cannot start its next cycle until the carriage has completed its half cycle already started. This is provided by the interlocking relay 26CR. Referring to the automatic carriage control, it will be noted that the ram motion initiated the carriage motion by a dog on the lay shaft closing a switch 37LS. Beside the other functions heretofore described, closing of this switch energizes the coil 710 of the interlock relay 26CR, this being done by closing a circuit from the transformer secondary T2, through leads 315, 316, 3160, closed switch 37LS, lead 525, closed motor reversing switch 5250, leads 5251, 5252, 5253, coil 710 of the relay 26CR, leads 841, 339 and 323, back to the transformer secondary T2. Energization of the coil 710 of the relay 26CR breaks a contact at 698. This breaking of the contact breaks the circuit which would otherwise be completed when the ram in its fully retracted position opens the switch 4LS, this circuit being the one which if the carriage were at its mid-position would start the ram forward in fast motion. The ram therefore stops. When the carriage is returned nearly to its center point, and a dog 132 thereon closes the switch 35LS, as before noted, the coil 615 of the relay 26CR is energized. This makes contact at 698 in series with the contact 699 of the relay 41CR which is de-energized at all times, except when the ram is in fully withdrawn position and closes a circuit through the forward ram motor solenoid 367. This circuit is from the transformer secondary through leads 315, 316, 317, 325, 698, 699, closed switch 700, leads 701 and 357, closed switch 358, leads 359 and 360, closed contact 361, lead 362, arm 365, lead 366, coil 367 of the forward motor switch coil 367, leads 368 and 369, back to the transformer secondary T2.

This starts the ram in forward motion, thus continuing the ram cycle.

EMERGENCY RETIRE BUTTON

Pressure on this button 820 retires both the ram and the carriage and leaves both stationary in fully retracted position, retracted position for the carriage being its mid-position, providing that when this button is pressed, the ram is in fast motion in either direction. It does not function when the ram is in slow feed. When it does function the ram retires and then stops after indexing the turret. Momentary closing of the switch 820 completes a circuit from the transformer secondary T2 through leads 315, 316, 822, retire button switch 820, leads 823 and 824, coil 821 of the relay 3CR, closed switch 825 of the relay 3CR, leads 338, 339 and 323, back to the transformer secondary T2. Closing of the retire switch 820 also closes a circuit through lead 826, the coil of the relay 36CR, lead 827 and lead 323, back to the transformer secondary T2.

Closing of the relay 36CR acts to return the carriage to mid-position in case it is displaced therefrom when the emergency retire button 820 is depressed and closing of the same relay 36CR also places the ram in retire condition. Closing of the relay 36CR closes a switch 830 of this relay, this completing a circuit through the coil of relay 35CR. This is done from the secondary of the transformer T2, through leads 315, 316, closed switch 830 of the relay 36CR, lead 831, coil of the relay 35CR, leads 693 and 323, back to the secondary of the transformer T2. Energizing the coil of the relay 35CR closes a switch 695 of that relay which energizes the coil of relay 92CR. This is done by the closing of a circuit in the transformer secondary T2 through leads 315, 316, 325, 694, switch 695 of the relay 35CR, leads 696 and 461, coil of the relay 92CR, leads 462, 339 and 323, back to the secondary of the transformer T2. Closing of the relay 92CR places the ram in rapid retire as described in connection with "Automatic Ram Control." The stopping of the ram in retire position is effected by energization of the coil 821 of the relay 3CR as follows. Energizing this relay coil 821 opens the switch 390 which breaks a circuit from the transformer secondary T2, leads 315, 316, 3260, closed switch 3261 of the switch 10LS, lead 386, closed switch 387 of the relay 6CR, open switch 390 of the relay 3CR, lead 391, closed switch 392 of the relay 1CR, leads 393 and 330, coil of relay 1CR, leads 332 and 333, back to the transformer secondary T2. In this condition relay 1CR is maintained closed only so long as the switch 4LS is closed so that when the ram reaches full retire position and opens the switch 4LS the ram stops.

As before noted, closing of the relay 36CR also returns the carriage to its central position regardless of its position relative thereto when the retire button was pressed. Closing of the relay 36CR closes a switch 840, energizing coil 5422 of the relay 30CR. This is done by the establishment of a circuit from the secondary of the transformer T2 through leads 315, 316, 3160, switch 540 of the relay 31LS, lead 5420, switch 840 of the relay 36CR, lead 5421, coil 5422 of the relay 30CR, switch 622 of the relay 30CR and leads 545 and 323, back to the secondary of the transformer T2. Energizing the coil 5422 of the relay 30CR closes the switch 592 which energizes the coil of the relay 38CR, which, as described under "Automatic Carriage Control" retires the carriage to mid-position.

MANUAL OPERATION

By throwing the switch 305 to manual position, all the relays energized through the transformer secondary T2 are disconnected, whereupon the motor reversing switches, the clutch and the slow feed levers, and also all the carriage controls may be actuable manually as desired.

From the foregoing description of an embodiment of the invention, it should be evident to those skilled in the art that various further changes and modifications might be made without departing from the spirit or scope of this invention.

We claim:

1. In combination with a turret lathe having a headstock, an indexable turret, a ram movable toward and from said headstock and carrying said turret, means for automatically indexing said turret on the retraction of said ram, means for moving said ram toward said headstock at a relatively slow working speed, connections between said working speed moving means and said ram including a member movable between a connecting and a disconnecting position and biased to disconnecting position, a latch for holding said member in connecting position, means actuated by said ram when it reaches predetermined points independently selectable for each index position of said turret for releasing said latch, and means for moving said ram in fast idle speed in either direction, of means for throwing out said fast speed ram-moving means and for moving said member to connecting position during the advance of said ram at points independently selectable for each index position of said turret, means actuated by the motion of said member to disconnecting position to connect said fast moving means to said ram in direction to retire said ram, and means actuated by said ram at its retire limit of motion for reversing said fast moving means to advance said ram at fast speed.

2. In combination with a turret lathe having a headstock, an indexable turret, a ram movable toward and from said headstock and carrying said turret, means for automatically indexing said turret on the retraction of said ram, means for moving said ram toward said headstock at a relatively slow working speed, connections between said working speed moving means and said ram including a member movable between a connecting and a disconnecting position and biased to disconnecting position, a latch for holding said member in connecting position, means actuated by said ram when it reaches predetermined points independently selectable for each index position of said turret for releasing said latch, and means for moving said ram in fast idle speed in either direction, of means for throwing out said fast speed ram-moving means and for moving said member to connecting position during the advance of said ram at points independently selectable for each index position of said turret, means actuated by the motion of said member to disconnecting position to connect said fast moving means to said ram in direction to retire said ram, means actuated by said ram at its retire limit of motion for reversing said fast moving means to advance said ram at fast speed, and means actuated by said ram during such advance and in the first turret index position of the cycle only to stop the advance of said ram before it reaches the position for disconnecting said fast speed moving means and moving said member to connecting position.

3. In combination with a turret lathe having a headstock, an indexable turret, a ram movable toward and from said headstock and carrying said turret, means for automatically indexing said turret on the retraction of said ram, means for moving said ram toward said headstock at a relatively slow working speed, connections between said working speed moving means and said ram including a member movable between a connecting and a disconnecting position and biased to disconnecting position, a latch for holding said member in connecting position, means actuated by said ram when it reaches predetermined points independently selectable for each index position of said turret for releasing said latch, and means for moving said ram in fast idle speed in either direction, of means for throwing out said fast speed ram-moving means and for moving said member to connecting position during the advance of said ram at points independently selectable for each index position of said turret, means actuated by the motion of said member to disconnecting position to connect said fast moving means to said ram in direction to retire said ram, means actuated by said ram at its retire limit of motion for reversing said fast moving means to advance said ram at fast speed, and means actuable by the operator at any time while said fast moving means is in operation to cause said fast moving means to retire said ram and to stop said ram in retired position.

4. In combination with a turret lathe having a headstock, an indexable turret, a ram movable toward and from said headstock and carrying said turret, means for automatically indexing said turret on the retraction of said ram, means for moving said ram toward said headstock at a relatively slow working speed, connections between said working speed moving means and said ram including a member movable between a connecting and a disconnecting position and biased to disconnecting position, a latch for holding said member in connecting position, means actuated by said ram when it reaches predetermined points independently selectable for each index position of said turret for releasing said latch, and means for moving said ram in fast idle speed in either direction, of means for throwing out said fast speed ram-moving means and for moving said member to connecting position during the advance of said ram at points independently selectable for each index position of said turret, means actuated by the motion of said member to disconnecting position to connect said fast moving means to said ram in direction to retire said ram, means actuated by said ram at its retire limit of motion for reversing said fast moving means to advance said ram at fast speed, and means actuated by said ram on its advance to a predetermined point by said fast speed moving means at any selected index position of said turret to immediately reverse said fast speed-moving means and to retract said ram to thereby skip the slow speed advance of said ram for the selected turret index position.

5. In combination with a turret lathe having a headstock, a ram movable toward and from said headstock, an indexable turret carried by said ram, means for automatically indexing said turret on the retraction of said ram, means for moving said ram toward said headstock at a relatively slow working speed, connections between said working speed moving means and said ram including a member movable between a connecting and a disconnecting position and biased to disconnecting position, a latch for holding said member in connecting position, means for moving said member to connecting position, means for moving said ram in high speed in either direction, a lay shaft carried by said ram parallel to the direction of motion of said ram, means for indexing said lay shaft with the indexing of said turret, and means carried by said lay shaft for actuating said member-moving means to control the change from fast to working speed at independently selected axial positions of said ram for the various index positions of said lay shaft.

6. In a turret lathe having a headstock, a ram movable toward and from said headstock, an indexable turret on said ram, means for automatically indexing said turret on the retraction of said ram from said headstock, a cross tool slide movable laterally of the motion of said ram and between said headstock and ram, means for moving said ram, means for moving said tool slide in said transverse direction at a relatively fast rate idly in opposite directions, means for moving said slide in one direction at a relative slow working rate, means actuable by said ram in one indexed position of said turret as said ram approaches said headstock to start said fast slide moving means to move a tool on said slide toward work on said headstock, means actuated by said slide when said tool approaches the work to throw out said fast moving means and throw in said slow rate feeding means, means effected by said slide after a predetermined amount of slow feed for throwing out said slow feed moving means and throwing in said fast moving means in reverse direction, and means actuated by said slide for throwing out said fast motion return when said slide has returned to starting position.

7. In a turret lathe having a headstock, a ram movable toward and from said headstock, an indexable turret on said ram, means for automatically indexing said turret on the retraction of said ram from said headstock, a cross tool carriage movable laterally of the motion of said ram and between said headstock and ram, means for moving said ram, means for moving said tool carriage in said transverse direction at a relatively fast rate idly in opposite directions, means for moving said carriage at a relative slow working rate, means actuable by said ram in one indexed position of said turret as said ram approaches said headstock to start said fast carriage moving means to move a tool on said carriage toward work on said headstock, means actuated by said carriage when said tool approaches the work to throw out said fast moving means and throw in said slow rate feeding means, means effected by said carriage after a predetermined amount of slow feed for throwing out said slow feed moving means and throwing in said fast moving means in reverse direction, means actuated by said carriage for throwing out said fast motion return when said carriage has returned to starting position, means actuated by said ram at a subsequent indexed position of said turret to start said carriage fast moving means in said reverse direction from said starting position to bring a second tool on said carriage toward the work, means actuated by said carriage as said second tool approaches the work to throw out said fast moving means and throw in said slow feed in the same direction, means actuated by said carriage after a predetermined amount of slow feed to throw out said slow feed and throw in said fast motion moving means in the first direction to return said carriage to starting position, and means actuated by said carriage when it reaches starting position to throw out said fast moving means and stop said carriage.

8. In a turret lathe having a headstock, a ram movable toward and from said headstock, an indexable turret on said ram, means for automatically indexing said turret on the retraction of said ram from said headstock, a cross tool carriage movable laterally of the motion of said ram and between said headstock and ram, means for moving said ram, means for moving said tool carriage in said transverse direction at a relatively fast rate idly in opposite directions, means for moving said carriage at a relative slow working rate, means actuable by said ram in one indexed position of said turret as said ram approaches said headstock to start said fast carriage moving means to move a tool on said carriage toward work on said headstock, means actuated by said carriage when said tool approaches the work to throw out said fast moving means and throw in said slow rate feeding means, means effected by said carriage after a predetermined amount of slow feed for throwing out said slow feed moving means and throwing in said fast moving means in reverse direction, means actuated by said carriage for throwing out said fast motion return when said carriage has returned to starting position, means actuated by said ram at a subsequent indexed position of said turret to start said carriage fast moving means in said reverse direction from said starting position to bring a second tool on said carriage toward the work, means actuated by said carriage as said second tool approaches the work to throw out said fast moving means and throw in said slow feed in the same direction, means actuated by said carriage after a predetermined amount of slow feed to throw out said slow feed and throw in said fast motion moving means in the first direction to return said carriage to starting position, means actuated by said carriage when it reaches starting position to throw out said fast moving means and stop said carriage, and interlocking connections between ram and carriage moving means requiring that said carriage be returned to starting position before said ram can advance a second time after initiation of carriage motion away from starting position.

9. In combination with a turret lathe having a headstock, an indexable turret, a ram movable from and toward said headstock and carrying said turret, means for automatically indexing said turret on the retraction of said ram, means for moving said ram at relatively high idle speed forward toward and backward from said headstock, and means for moving said ram forward toward said headstock at a relatively slow working speed, of a plurality of stationary switches, electrically operated means actuated by the actuation of one of said switches to throw out the fast motion moving means in forward direction and to throw in the slow feed, electrically operated means actuated by actuation of another of the switches to reverse the slow advance motion forward to fast retire motion, electrically operated means actuated by the actuation of a third of said switches for rendering inoperative any advance motion to stop said ram, and devices movable with said ram and selectively positioned with relation to the various index positions of said turret and selected lengthwise positions of said ram for actuating said switches.

10. In combination with a turret lathe having a headstock, an indexable turret, a ram movable from and toward said headstock and carrying said turret, means for automatically indexing said turret on the retraction of said ram, means for moving said ram at relatively high idle speed forward toward and backward from said headstock, and means for moving said ram forward toward said headstock at a relatively slow working speed, of a cross carriage carrying a tool operative on work carried by said headstock, means for moving said cross carriage from a tool-inoperative position to bring said tool toward and operate upon the work, automatically acting means for returning said carriage to said tool-inoperative position after the tool has operated on the work to a predetermined extent, a plurality of stationary switches, electrically operated means actuated by the actuation of one of said switches to throw out the fast motion moving means in forward direction and to throw in the slow feed, electrically operated means actuated by actuation of another of said switches to start operation of said carriage-moving means to move said carriage away from tool-inoperative position, electrically operated means actuated by the actuation of a third of said switches for rendering inoperative any advance motion to stop said ram, and devices movable with said ram and selectively positioned with relation to the various index positions of said turret and selected lengthwise positions of said ram for actuating said switches.

11. In combination with a turret lathe having a headstock, an indexable turret, a ram movable from and toward said headstock and carrying said turret, means for automatically indexing said turret on the retraction of said ram, means for moving said ram at relatively high idle speed forward toward and backward from said headstock, and means for moving said ram forward toward said headstock at a relatively slow working speed, of a cross carriage carrying a tool operative on work carried by said headstock, means for moving said cross carriage from a tool-inoperative position to bring said tool toward and operate upon the work, automatically acting means for returning said carriage to said tool-inoperative position after the tool has operated on the work to a predetermined extent, a plurality of stationary switches, electrically operated means actuated by the actuation of one of said switches to throw out the fast motion moving means in forward direction and to throw in the slow feed, electrically operated means actuated by actuation of another of said switches to start operation of said carriage-moving means to move said carriage away from tool-inoperative position, electrically operated means actuated by the actuation of a third of said switches for rendering inoperative any advance motion to stop said ram, devices movable with said ram and selectively positioned with relation to the various indexed positions of said turret and selected lengthwise positions of said ram for actuating said switches, and interlocking means preventing actuation of said ram-moving means forward from retire position after initiation of said carriage motion until after said carriage has returned to tool-inoperative position.

12. In combination with a turret lathe having a headstock, an indexable turret, a ram movable from and toward said headstock and carrying said turret, means for automatically indexing said turret on the retraction of said ram, means for moving said ram at relatively high idle speed forward toward and backward from said headstock, and means for moving said ram forward toward said headstock at a relatively slow working speed, of a cross carriage carrying a tool operative on work carried by said headstock, means for moving said cross carriage from a tool-inoperative position to bring said tool toward and operate upon the work, automatically acting means for returning said carriage to said tool-inoperative position after the tool has operated on the work to a predetermined extent, a plurality of stationary switches, electrically operated means actuated by the actuation of one of said switches to throw out the fast motion moving means in forward direction and to throw in the slow feed, electrically operated means actuated by actuation of another of said switches to start operation of said carriage-moving means to move said carriage away from tool-inoperative position, electrically operated means actuated by the actuation of a third of said switches for rendering inoperative any advance motion to stop said ram, devices movable with said ram and selectively positioned with relation to the various index positions of said turret and selected lengthwise positions of said ram for actuating said switches, and interlocking means preventing actuation of said ram-moving means forward from retire position after initiation of said carriage motion until after said carriage has returned to tool-inoperative position and thereupon rendering said ram fast motion moving means operative to advance said ram.

13. In a lathe, a headstock, a tool carrier movable to advance toward and retire from said headstock, a tool carriage movable transverse of said headstock, means for moving said carrier in fast motion in advance and retire directions, means for moving said carrier in advance in slow feed, means for moving said carriage in opposite directions from a mid-position selectively in fast idle or slow feeding speeds, means for throwing out the carrier fast motion toward said headstock and for throwing in said slow carrier feed, means for throwing in the carriage fast motion, dogs on said carrier for actuating said throwing means at predetermined positions of said carrier when said carrier is advancing, and means blocking actuation of said throwing means when said carrier is retiring.

14. In a lathe, a headstock, a tool carrier movable to advance toward and retire from said headstock, a tool carriage movable transverse of said headstock, means for moving said carrier in fast motion in advance and retire directions, means for moving said carrier in advance in slow feed, means for moving said carriage in opposite directions from a mid-position selectively in fast idle or slow feeding speeds, means for throwing out the carrier fast motion toward said headstock and for throwing in said slow carrier feed, means for throwing in the carriage fast motion, dogs on said carrier for actuating said throwing means at predetermined positions of said carrier when said carrier is advancing, means blocking actuation of said throwing means when said carrier is retiring, means actuated by said carrier upon reaching a predetermined position in slow motion to throw out said slow motion and throw in said fast motion in retire direction, means actuated by said carriage when it reaches a predetermined position remote from said mid-position in fast motion to throw out said fast motion and throw in said slow feed, means actuated by said carriage when said carriage reaches predetermined positions remote from said mid-position in feed speed to throw out said feed speed and throw in said fast speed in reverse direction, means for stopping said carriage motion in said mid-position, means for stopping said carrier in fully retired position when said carriage is out of said mid-position, and means actuated by said carriage for restarting said carrier in advance direction as said carriage approaches said mid-position.

15. In combination with a turret lathe having a headstock, an indexable turret, a ram movable toward and from said headstock and carrying said turret, means for automatically indexing said turret on the retraction of said ram, means for moving said ram toward said headstock at a relatively slow working speed, connections between said working speed moving means and said ram including a member movable between a connecting and a disconnecting position and biased to disconnecting posiiton, a latch for holding said member in connecting position, means actuated by said ram when said ram reaches a predetermined point independently selectable for each indexed position of said turret for releasing said latch, and means for moving said ram in fast idle speed in either direction, of means for throwing out said fast speed ram moving means and for moving said member into connecting position during the advance of said ram at points independently selectable for each indexed position of said turret, means actuated by said member when said latch is released to operatively connect said fast moving means to retire said ram, means actuated by said ram at its retire limit of motion for reversing said fast moving means to advance said ram at fast speed, and means actuable by the operator at any time while said fast moving means is in forward ram moving condition to reverse the direction of motion of said ram and retire said ram and at such retirement to resume the automatic ram-moving cycle.

16. In combination with a turret lathe having a headstock, a ram movable toward and from said headstock, an indexable turret carried by said ram, means for automatically indexing said turret on the retraction of said ram, means for moving said ram toward said headstock at a relatively slow working speed, connections between said working speed moving means and said ram including a member movable between a connecting and a disconnecting position and biased to disconnecting position, a latch for holding said member in connecting position, means for moving said member into connecting position and there latching it, means for moving said ram in high speed in either direction, a lay shaft carried by said ram parallel to the direction of motion of said ram, means interconnecting said lay shaft and turret for indexing said lay shaft with the indexing of said turret, means carried by said lay shaft in its various index positions for actuating said member-moving means to control the change from fast to working speed at selected axial positions of said ram, means actuable when said ram is advancing in high speed to reverse and retire said ram, and means carried by said lay shaft in position to operate said actuable means in certain only of said index positions to cause skipping of the slow speed advance of said ram at said certain index positions.

17. In a turret lathe having a headstock, a ram movable toward and from said headstock, an indexable turret on said headstock, means for automatically indexing said turret on the retraction of said ram from said headstock, a cross tool slide movable laterally of the motion of said ram and between said headstock and ram, means for moving said ram, means for moving said tool slide in said transverse direction at a relatively fast rate idly in opposite directions, means for moving said slide at a relative slow working rate, means actuable by said ram in one indexed position of said turret as said ram approaches said headstock to start said fast slide moving means to move a tool on said slide toward work on said headstock, means actuated by said slide when said tool approaches the work to throw out said fast moving means and throw in said slow rate feeding means, means effected by said slide after a predetermined amount of slow feed for throwing out said slow feed moving means and throwing in said fast moving means in reverse direction, means actuated by said slide for throwing out said fast motion return when said slide has returned to starting position, means actuated by said ram at a subsequent indexed position of said turret to start said carriage fast moving means in said reverse direction from said starting position to bring a second tool on said carriage toward the work, means actuated by said carriage as said second tool approaches the work to throw out said fast moving means and throw in said slow feed in the same direction, means actuated by said carriage after a predetermined amount of slow feed to throw out said slow feed and throw in said fast motion moving means in the first direction to return said carriage to starting position, means actuated by said carriage when it reaches starting position to throw out said fast moving means and stop said carriage, and means actuable at will whenever said ram is in fast motion to actuate said ram fast moving means to retire and stop said ram and when said carriage is out of mid-position to actuate said carriage moving means to return said carriage to mid-position and there stop.

JOHN E. LOVELY.
RALPH M. GAMBLE.

REFERENCES CITED

The following references are of record in the file of this patent:

UNITED STATES PATENTS

| Number | Name | Date |
| --- | --- | --- |
| 1,691,595 | Van Hamersveld | Nov. 13, 1928 |
| 2,047,181 | Ferris | July 14, 1936 |
| 2,056,792 | Lovely | Oct. 6, 1936 |
| 2,116,376 | Anderson | May 3, 1938 |
| 2,255,739 | Curtis | Sept. 9, 1941 |
| 2,289,957 | Godfriaux | July 14, 1942 |
| 2,374,365 | MacNeill | Apr. 24, 1945 |